(12) United States Patent
Yoda

(10) Patent No.: US 8,184,956 B2
(45) Date of Patent: May 22, 2012

(54) METHOD AND APPARATUS FOR STORING APPRECIATION DATA, METHOD AND APPARATUS FOR GENERATING ORDER INFORMATION, METHOD AND APPARATUS FOR PROCESSING APPRECIATION DATA, AND PROGRAMS THEREFOR

(75) Inventor: Akira Yoda, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1199 days.

(21) Appl. No.: 10/253,538

(22) Filed: Sep. 25, 2002

(65) Prior Publication Data

US 2003/0059202 A1 Mar. 27, 2003

(30) Foreign Application Priority Data

Sep. 26, 2001 (JP) ................................. 2001-294230

(51) Int. Cl.
*H04N 5/93* (2006.01)
(52) U.S. Cl. ........ 386/279; 386/286; 386/224; 386/294; 386/295
(58) Field of Classification Search .................... 386/46, 386/35, 4, 52, 117, 95
See application file for complete search history.

(56) References Cited

U.S. PATENT DOCUMENTS

| | | | | |
|---|---|---|---|---|
| 5,109,508 A | * | 4/1992 | Mitsumori et al. ................ 707/1 |
| 5,132,809 A | * | 7/1992 | Kikuchi et al. ................ 358/403 |
| 5,729,516 A | * | 3/1998 | Tozaki et al. ............... 369/53.21 |
| 6,014,133 A | * | 1/2000 | Yamakado et al. ............ 345/501 |
| 6,112,010 A | * | 8/2000 | Koyama et al. ................. 386/95 |
| 6,133,951 A | * | 10/2000 | Miyadera .................... 348/220.1 |
| 6,289,167 B1 | * | 9/2001 | Boetje et al. ..................... 386/52 |
| 6,424,795 B1 | * | 7/2002 | Takahashi et al. ............ 386/120 |
| 6,442,327 B1 | * | 8/2002 | Yamada et al. ............... 386/230 |
| 6,504,620 B1 | * | 1/2003 | Kinjo ........................... 358/1.15 |
| 6,628,899 B1 | | 9/2003 | Kito |
| 6,763,377 B1 | * | 7/2004 | Belknap et al. ................ 709/223 |
| 6,871,009 B1 | * | 3/2005 | Suzuki ............................ 386/95 |
| 7,193,646 B1 | * | 3/2007 | Shioji ........................ 348/220.1 |
| 2002/0085101 A1 | | 7/2002 | Kowno et al. |
| 2002/0110354 A1 | * | 8/2002 | Ikeda et al. ...................... 386/52 |
| 2003/0133506 A1 | * | 7/2003 | Haneda .................... 375/240.25 |
| 2003/0154485 A1 | * | 8/2003 | Johnson et al. ................ 725/89 |
| 2005/0238332 A1 | * | 10/2005 | Tsujii et al. .................... 386/111 |
| 2007/0070471 A1 | * | 3/2007 | Shiohara ...................... 358/527 |
| 2007/0297757 A1 | * | 12/2007 | Kauffman et al. .............. 386/55 |
| 2008/0025690 A1 | * | 1/2008 | Kondo et al. ................... 386/46 |

(Continued)

FOREIGN PATENT DOCUMENTS

JP 9-331494 A 12/1997

(Continued)

*Primary Examiner* — Helen Shibru
(74) *Attorney, Agent, or Firm* — Sughrue Mion, PLLC

(57) ABSTRACT

A large amount of appreciation data such as image data exceeding capacity of a recording medium is easily managed. Image data are recorded in a recording medium by a digital camera. When a user requests storage of the image data from a DPE store, the image data are read from the recording medium and stored in a storage system. The image data are deleted from the recording medium and thumbnail image data are generated. The thumbnail image data are recorded in the recording medium and provided to the user. In this manner, free space in the recording medium can be saved. By referring to the thumbnail image data, the image data that have been stored at the DPE store can be easily confirmed, which leads to easy management of the image data.

54 Claims, 6 Drawing Sheets

U.S. PATENT DOCUMENTS

2008/0031586 A1 * 2/2008 Itoh et al. .................. 386/46

FOREIGN PATENT DOCUMENTS

| JP | 2000-45177 | 2/2000 |
| --- | --- | --- |
| JP | 2000-177210 | 6/2000 |
| JP | 2000-184324 | 6/2000 |
| JP | 2000-312325 | 11/2000 |
| JP | 2001-177750 A | 6/2001 |
| JP | 2001-177804 A | 6/2001 |

* cited by examiner

METHOD AND APPARATUS FOR STORING APPRECIATION DATA, METHOD AND APPARATUS FOR GENERATING ORDER INFORMATION, METHOD AND APPARATUS FOR PROCESSING APPRECIATION DATA, AND PROGRAMS THEREFOR

BACKGROUND OF THE INVENTION

1. Field of the Invention

The present invention relates to a method and an apparatus for storing appreciation data such as image data, audio data, and moving image data in a database or the like, to a method and an apparatus for generating order information for carrying out processing on the appreciation data, to a method and an apparatus for carrying out processing such as printing processing on the appreciation data, and to programs that cause a computer to execute the methods.

2. Description of the Related Art

Image data and moving image data can be obtained by photographing a subject with an image recording device such as a digital camera and a digital camcorder, while audio data can be obtained by using a portable music recording device or the like. Such data for appreciation (hereinafter referred to as appreciation data) can be reproduced and appreciated freely without constraints of time and place, by using the image recording device or the music recording device that obtained the appreciation data (hereinafter referred to as an appreciation data generation apparatus).

Appreciation data obtained by using such an appreciation data generation apparatus are stored in a portable recording medium such as an IC memory, a DV tape, a Memory Stick, and a Smart Media. However, a recording medium has limited storage capacity. Therefore, in the case where a large amount of appreciation data is recorded, it is necessary to back up the appreciation data in a plurality of recording media or in another large-capacity recording medium. As a method of image-data backup, a method of transferring appreciation data via a communication line to external storage separated from an appreciation data generation apparatus has been proposed (Japanese Unexamined Patent Publication No. 2000-45177). Furthermore, a digital camera, a printer, and a camera station for erasing image data or adding a flag enabling erasure to image data stored in a recording medium after sending the image data to an external data storing apparatus via a communication line have also been proposed (Japanese Unexamined Patent Publications Nos. 2000-177210, 2000-184324, and 2000-312325).

However, using a plurality of recording media is costly. In addition, storage of recording media and management of appreciation data recorded therein is troublesome. Furthermore, in the method described in Japanese Unexamined Patent Publication No. 2000-177210, image data in a recording medium are erased after sending the image data to a data storing apparatus. Therefore, in the case where moving image data for 20 minutes need to be recorded by a digital camcorder in a recording medium which can store moving image data for only 10 minutes, the moving image data for the first 10 minutes are recorded and transferred to a data storing apparatus. Thereafter, the moving image data are erased from the recording medium and the moving image data for the second 10 minutes are recorded in the recording medium. In this case, since the recording medium stores only the moving image data for the second 10 minutes, the moving image data for the first 10 minutes cannot be reproduced by the digital camcorder. Consequently, the moving image data for the first 10 minutes cannot be immediately confirmed. Moreover, in the case where photography is carried out with a digital camera using a recording medium for up to 24 images, only 24 images can be confirmed with the digital camera. Therefore, as in the case of the moving image data described above, image data stored in a data storing apparatus cannot be confirmed immediately.

SUMMARY OF THE INVENTION

The present invention has been conceived based on consideration of the circumstances described above. An object of the present invention is therefore to enable easy management of a large amount of appreciation data exceeding capacity of a recording medium.

An appreciation data storing method of the present invention comprises the steps of:

outputting appreciation data read from a first recording medium to data storage means for storing the appreciation data; and outputting index data generated from the appreciation data and storage location information for identifying a storage location of the appreciation data to recording means for recording the index data and the storage location information in a second recording medium.

The recording medium refers to a portable recording medium such as an IC memory, a DV tape, a Memory Stick, and a Smart Media.

The data storage means has a large-capacity recording medium that can store a large amount of appreciation data. In the case where reading means for reading the appreciation data from the first recording medium is located at the same place as the data storage means (such as a DPE store), the appreciation data are output directly from the reading means to the data storage means. If the data storage means is located in an image server on a network and if the reading means is located separately from the image server for an appreciation data generation apparatus that generated the appreciation data, the appreciation data read from the first recording medium by the reading means are output to the data storage means via the network.

The index data refer to data having a smaller data size than the appreciation data but having enough quality to represent the content of the appreciation data. More specifically, in the case where the appreciation data are image data, the index data refer to data representing images reduced from images represented by the appreciation data, or data having a higher compression rate. In the case of audio data, the index data refer to short clip data representing an introduction or highlight, or a title of music, for example. In the case of moving image data, the index data refer to short clip data representing an introduction or highlight, or image data (reduced or not) representing a representative frame, or data having a higher compression rate, for example.

Means for generating the index data and means for generating the storage location information may be located at the same place as the data storage means. Alternatively, the index data generation means and the storage location information generation means may comprise the appreciation data generation apparatus that records the appreciation data in the first recording medium so that the appreciation data generation apparatus can also generate the index data.

As the storage location information for identifying the storage location of the appreciation data, the URL or IP address of an image server having the data storage means or a path name (a directory name) for identifying the storage location of the appreciation data can be used.

The recording means records the index data and the storage location information in the second recording medium. In the case where the index data generation means and the storage location information generation means are located at the same place as the recording means (such as a DPE store), the index data and the storage location information are output directly to the recording means. In the case where the index data generation means and the storage location information generation means comprise an image server on a network and the recording means is located separately from the image server for the appreciation data generation apparatus, the index data and the storage location information are output to the recording means via the network. In this case, if the index data generation means comprises the appreciation data generation apparatus, only the storage location information is output to the recording means via the network and the index data are output directly from the index data generation means to the recording means.

The second recording medium has larger free space than the first recording medium, or the size of the free space thereof can be increased.

In the case where a plurality of image data sets is stored in the first recording medium, the index data may be generated only for a portion of the image data sets, as desired by a user.

In the appreciation data storing method of the present invention, it is preferable for the appreciation data to be deleted from the first recording medium in the case where the first recording medium is also used as the second recording medium. Alternatively, in this case, the appreciation data recorded in the first recording medium may be added with deletion information indicating that the appreciation data can be deleted.

The deletion information indicates the fact that the appreciation data may be deleted, by being added to the appreciation data. For example, character information indicating the fact may be added to a file name of the appreciation data. Alternatively, a check box for an Archive property in file properties of the appreciation data may be cleared to indicate the fact.

In this case, the second recording medium has smaller free space than the first recording medium, due to the index data and the storage location information recorded therein. However, the appreciation data can be deleted freely based on the deletion information. Therefore, the size of free space in the second recording medium can be increased to become larger than in the first recording medium by the deletion.

In the appreciation data storing method of the present invention, a user ID for identifying the user who requested storage of the appreciation data and a data ID for identifying the appreciation data may be added to the appreciation data to be output to the data storage means. In this case, the user ID and the data ID are also output to the recording means by being added to the index data.

The user ID and the data ID are added by being unified with the appreciation data or the index data. For example, the user ID and the data ID may be added by being recorded in tag information of the appreciation data or the index data, or being related to the appreciation data or the index data.

In the appreciation data storing method of the present invention, apparatus type information representing the type of the appreciation data generation apparatus that generated the appreciation data and/or medium type information representing the type of the first recording medium may be added to the appreciation data to be output to the data storage means.

The type of the appreciation data generation apparatus varies, depending on the type of the appreciation data. For example, if the appreciation data are image data, the appreciation data generation apparatus refers to a digital camera. If the appreciation data are moving image data or audio data, the appreciation data generation apparatus refers to a digital camcorder or a music recording apparatus, for example.

In the case of image data, an apparatus for reproducing the index data may reproduce only JPEG image data or TIFF image data. Therefore, it is preferable for the index data to be generated in a format that is appropriate for the apparatus for reproducing the index data.

In the appreciation data storing method of the present invention, processing information for processing the appreciation data stored in the data storage means may be output to the recording means.

The processing information is information representing the content of processing that can be carried out on the appreciation data (such as image processing for enhancing sharpness, and sound effect processing for adding an echo effect) The processing information may be information representing the content of a service available at a DPE store (such as printing of picture postcards, and printing on a mug cup) in the case where the appreciation data are image data and the data storage means is installed in the DPE store, for example.

In the appreciation data storing method of the present invention, in the case where the index data already exist in the first recording medium, small-size index data having a data size smaller than a data size of the index data but including the content of the index data in the first recording medium may be generated and output to the recording means.

The quality of the small-size index data is lower than the quality of the index data. However, the small-size index data are sufficient for confirming the content of the appreciation data, although the data size thereof is smaller.

An order information generation method of the present invention is a method of generating order information representing the content of processing to be carried out on the appreciation data, based on the index data output to the recording means and recorded in the second recording medium according to the appreciation data storing method of the present invention.

The order information includes information for specifying the content of processing to be carried out on the appreciation data (a number for specifying the processing such as ordinary printing and picture postcard generation in the case of image data, for example), a file name for specifying the appreciation data, the name and address of a user who places an order, and the zip code and the phone number thereof, for example. Especially, in the case of image data, a print size, a quantity of prints, a quality of printing paper (such as glossy or non-glossy), the thickness of the printing paper, the content of photographic processing, and trimming specification are included in the order information, for example.

An appreciation data processing method of the present invention comprises the steps of:

obtaining the appreciation data from the data storage means, based on the order information generated according to the order information generation method of the present invention; and generating processed appreciation data by carrying out the processing on the appreciation data, based on the order information.

In the appreciation data processing method of the present invention, the appreciation data may be image data and the processing carried out according to the order information may be printing processing on the image data.

In this case, status information representing a state of the printing processing may be generated and output to a monitor or the appreciation data generation apparatus.

The printing processing includes image processing carried out on the image data for obtaining prints, such as sharpness processing and tone processing, and print output processing for outputting the image data from a printer.

An appreciation data storing apparatus of the present invention comprises control means for outputting appreciation data read from a first recording medium to data storage means used for storage of the appreciation data, and for outputting index data generated from the appreciation data and storage location information for identifying a storage location of the appreciation data to recording means for recording the index data and the storage location information in a second recording medium.

The appreciation data storing apparatus of the present invention may further comprise reading means for reading the appreciation data from the first recording medium, the data storage means, index data generation means for generating the index data, storage location information generation means for generating the storage location information and/or the recording means.

In the appreciation data storing apparatus of the present invention, in the case where the first recording medium is also used as the second recording medium, the control means may delete the appreciation data from the first recording medium. Alternatively, in this case, the control means may add deletion information indicating that the appreciation data can be deleted to the appreciation data stored in the first recording medium.

Furthermore, in the appreciation data storing apparatus of the present invention, the control means may add a user ID for identifying a user who requested storage of the appreciation data and a data ID for identifying the appreciation data to the appreciation data to be output to the data storage means. In this case, the control means also adds the user ID and the data ID to the index data to be output to the recording means.

In the appreciation data storing apparatus of the present invention, the control means may add apparatus type information representing the type of an appreciation data generation apparatus that generated the appreciation data and/or medium type information representing the type of the first recording medium to the appreciation data to be output to the data storage means.

In the appreciation data storing apparatus of the present invention, it is preferable for the index data to be generated in a format that is appropriate for an apparatus that reproduces the index data.

In the appreciation data storing apparatus of the present invention, the control means may output processing information for processing the appreciation data stored in the data storage means to the recording means.

In the appreciation data storing apparatus of the present invention, in the case where the index data already exist in the first recording medium, the control means may output small-size index data that are generated to have a data size smaller than a data size of the index data but to include the content of the index data to the recording means.

An order information generation apparatus of the present invention comprises generation means for generating order information representing the content of processing to be carried out on the appreciation data, based on the index data output to the recording means and recorded in the second recording medium by the appreciation data storing apparatus of the present invention.

An appreciation data processing apparatus of the present invention comprises:

acquisition means for obtaining the appreciation data from the data storage means, based on the order information generated by the order information generation apparatus of the present invention; and processing means for generating processed appreciation data by carrying out the processing on the appreciation data, based on the order information.

In the appreciation data processing apparatus of the present invention, the appreciation data may be image data and the processing that is carried out according to the order information may be printing processing on the image data.

In this case, the appreciation data processing apparatus may further comprise:

status information generation means for generating status information representing a state of the printing processing; and output means for outputting the status information for display on a monitor.

The appreciation data storing method, the order information generation method and the appreciation data processing method of the present invention may be provided as programs that cause a computer to execute the methods.

According to the present invention, the appreciation data read from the first recording medium are output to the data storage means and stored therein. Meanwhile, the index data generated from the appreciation data are output to the recording means together with the storage location information representing the storage location of the appreciation data, and recorded in the second recording medium. Since the appreciation data are stored in the data storage means, the second recording medium does not need to store the appreciation data. Therefore, the free space in the second recording medium can be saved. Consequently, more appreciation data can be stored newly in the second recording medium.

Meanwhile, the index data having a smaller data size than the appreciation data but enabling confirmation of the content of the appreciation data are stored in the second recording medium. Therefore, the appreciation data stored in the data storage means can be confirmed easily by referring to the index data. Furthermore, since the storage location information is also recorded in the second recording medium, the appreciation data can be easily accessed, by referring to the storage location information. Since the index data has a smaller data size than the appreciation data, index data corresponding to more appreciation data can be stored in the second recording medium. As a result, a large amount of the appreciation data can be managed by using the second recording medium alone. Moreover, the second recording medium is portable, and the appreciation data can be managed by the appreciation data generation apparatus that recorded and reproduces the appreciation data by using the second recording medium, without involving a personal computer. Therefore, a user without a personal computer can easily manage the appreciation data.

In the case where the first recording medium is also used as the second recording medium, the free space of the second recording medium can be saved by deleting the appreciation data from the first recording medium.

In this case, by adding the deletion information to the appreciation data recorded in the first recording medium, the appreciation data that already exist in the first recording medium can be deleted in accordance with the size of appreciation data to be further recorded in the second recording medium.

Furthermore, the user ID and the data ID can be added to the appreciation data and output to the data storage means to be stored therein, while the index data added with the user ID and the data ID are output to the recording means and stored in the second recording medium. In this manner, the index data and the appreciation data can be related easily. Therefore, in the case where processing needs to be carried out on the appreciation data, the processing on the appreciation data can be requested easily by referring to the index data.

The apparatus type information representing the type of the appreciation data generation apparatus that generated the appreciation data and/or the medium type information representing the type of the first recording medium are added to the appreciation data, and the appreciation data added with the information are stored in the data storage means. The format of the appreciation data varies, depending on the type of the appreciation data generation apparatus that generated the data and/or the first recording medium storing the appreciation data. Therefore, in the case where the appreciation data are reproduced by an appreciation data generation apparatus that is different from the appreciation data generation apparatus that generated the appreciation data and/or in the case where the appreciation data are recorded in a recording medium of a format different from the first recording medium that stores the appreciation data, the format of the appreciation data needs to be changed. In this case, the current format of the appreciation data can be recognized easily by simply referring to the apparatus type information and/or the medium type information added to the appreciation data, and format conversion processing or the like can be carried out easily.

By outputting the index data to the recording means after converting the appreciation data into the format that is appropriate for the apparatus that reproduces the appreciation data, the index data of the appropriate format can be recorded in the second recording medium. Therefore, the reproduction apparatus can immediately reproduce the index data without conversion of the index data.

Moreover, by outputting the processing information for processing the appreciation data to the recording means, the processing information is recorded in the second recording medium. Therefore, the processing to be carried out on the appreciation data can be easily specified, by referring to the processing information.

In the case where the index data have already been recorded in the first recording medium, the small-size index data having the smaller data size than the index data but including the content of the index data are output to the recording means, and the small-size index data are recorded in the second recording medium. The small-size index data are sufficient for confirming the content of the appreciation data although the quality thereof is lower than that of the index data. Therefore, by recording the small-size index data instead of the index data in the second recording medium, the free space of the second recording medium can be saved and the appreciation data can still be managed.

In the case of image data, by generating the status information representing the state of printing processing and by outputting the status information to the monitor or the appreciation data generation apparatus, the status information can be displayed. Therefore, by viewing the monitor or the like, the state of printing processing can be confirmed, which is convenient for the user.

DESCRIPTION OF THE PREFERRED EMBODIMENTS

Figure 1:
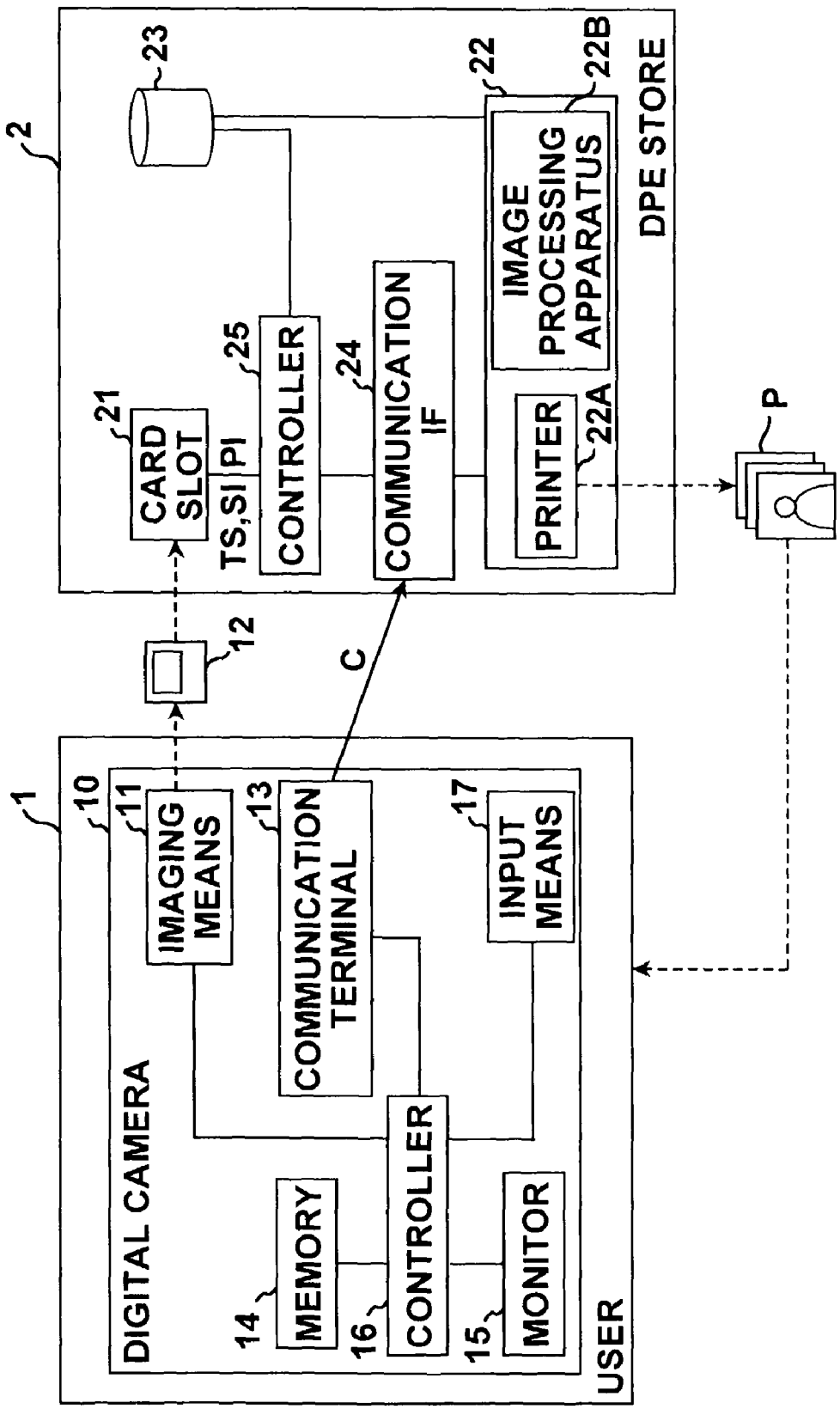
FIG. 1 is a block diagram showing a configuration of a printing service system adopting an appreciation data storing apparatus, an order information generation apparatus and an appreciation data processing apparatus of a first embodiment of the present invention.

Hereinafter, embodiments of the present invention will be explained. In the embodiments below, image data obtained by using a digital camera are used as appreciation data. FIG. 1 is a block diagram showing a configuration of a printing service system adopting an appreciation data storing apparatus, an order information generation apparatus, and an appreciation data processing apparatus of a first embodiment of the present invention. As shown in FIG. 1, the printing service system in the first embodiment stores, in a DPE store 2, image data obtained by a user 1 with a digital camera. In this embodiment, prints, data and the like are exchanged between the user 1 and the DPE store 2. In FIG. 1, the flow of data is shown by a solid line while the flow of an object is shown by broken lines.

The user 1 has a digital camera 10. The digital camera 10 comprises imaging means 11 including a lens, CCDs, a shutter, and an image data recording unit for recording an image data set or image data sets S (hereinafter referred to as the image data sets S) in a recording medium 12 for the digital camera 10, a wireless communication terminal 13, a memory 14 having software for print order installed therein, a liquid crystal display monitor 15 for displaying an image and the like, a controller 16 for controlling the imaging means 11, the communication terminal 13, and the monitor 15, and input means 17 such as ten keys for carrying out various kinds of input. In this embodiment, the digital camera 10 corresponds to the order information generation apparatus.

The user 1 generates order information C by using the software installed in the memory 14 and places a print order by accessing a communication IF (interface) 24 in the DPE store 2 via the communication terminal 13.

The DPE store 2 has a card slot 21 for reading the image data sets S from the recording medium 12 provided by the user 1 at the store 2, a digital mini-laboratory 22 for obtaining a print or prints P (hereinafter referred to as the prints P) based on the image data sets S, a storage system 23 for storing the image data sets S, the communication IF 24 for receiving the print order as will be explained later, and a controller 25 for controlling the card slot 21, the digital mini-laboratory 22, the storage system 23, and the communication IF 24. The card slot 21 corresponds to reading means and recording means, and the digital mini-laboratory 22 corresponds to processing means. The storage system 23 acts as data storage means, and the communication IF 24 acts as output means. The controller 25 corresponds to control means, index data generation means, storage location information generation means, acquisition means, and status information generation means.

The card slot 21 is for the recording medium 12. However, in order to be compatible with recording media of various types, it is preferable that various types of card slots 21 are installed in the DPE store 2.

The digital mini-laboratory 22 comprises a printer 22A for obtaining the prints P based on the image data sets S, and an image processing apparatus 22B for carrying out image processing on the image data sets S.

The communication IF 24 has a function of transmitting and receiving data and information, and is always connected to a network in a wireless manner.

The controller 25 comprises a computer and a printer, and manages and controls the card slot 21, the digital mini-laboratory 22, the storage system 23, and the communication IF 24. The controller 25 stores the image data sets S read from the recording medium 12 in the storage system 23, and generates a thumbnail image data set or thumbnail image data sets TS (hereinafter referred to as the thumbnail image data sets TS) of the image data sets S and storage location information SI such as a path name for identifying where the image data sets S are stored in the storage system 23. The controller 25 outputs the thumbnail image data sets TS and the storage location information SI to the card slot 21, and causes the thumbnail image data sets TS and the storage location information SI to be stored in the recording medium 12. When the image data sets S are stored in the storage system 23, the image data sets S may be subjected to automatic correction for colors, density and sharpness, for example. Information indicating whether or not the image data sets S have been subjected to the automatic correction may be added to the image data sets S.

The thumbnail image data sets TS are generated based on the number of pixels for display on the monitor 15 of the digital camera 10. More specifically, the thumbnail image data sets TS are generated by carrying out reduction processing on the image data sets S for an image size of sufficient quality for reproduction on the monitor 15. In the case where the number of the image data sets S to be stored in the storage system 23 is more than one, the image data sets S used for generation of the thumbnail image data sets TS may be selected by the user 1 in advance. For example, at the time the user 1 requests storage of the image data sets S from the DPE store 2, the user 1 may add generation information indicating generation of the thumbnail image data sets TS to the image data sets S as desired, as tag information thereof. In this manner, the controller 25 can judge whether or not the generation information regarding the thumbnail image data sets TS exists in the tag information, and the thumbnail image data sets TS are generated only from the image data sets S added with the generation information.

The thumbnail image data sets TS are generated in a format appropriate for the digital camera 10, in view of reproduction by the digital camera 10. For example, if the digital camera 10 can reproduce only JPEG image data, the thumbnail image data sets TS are generated in JPEG format. In the case where the digital camera 10 can reproduce only TIFF image data, the thumbnail image data sets TS are generated in TIFF format. By using the format appropriate for reproduction by the digital camera 10, thumbnail images represented by the thumbnail image data sets TS can be reproduced immediately on the monitor 15, without conversion of the format of the thumbnail image data sets TS by the digital camera 10. The format of the thumbnail image data sets TS reproducible by the digital camera 10 is set based on apparatus type information regarding the digital camera 10 added to the image data sets S, as will be explained later.

Processing information PI may also be output to the card slot 21 and recorded in the recording medium 12. The processing information PI represents the type of image processing, indication of print generation or picture postcard generation, available print sizes, and the content of printing processing that can be carried out on the image data sets S at the DPE store 2. The processing information PI is stored in the storage system 23 and read by the controller 25 to be output to the card slot 21 for recording in the recording medium 12. By recording the processing information PI in the recording medium 12 in the above manner, the user 1 can easily select the processing or the like on the image data sets S by using the digital camera 10 while referring to the processing information PI, as will be explained later.

The controller 25 adds a user ID for identifying the user 1 who requested storage of the image data sets S and a data ID for identifying each of the image data sets S to the respective image data sets S to be stored in the storage system 23. The controller 25 also adds the user ID and the data ID to each of the thumbnail image data sets TS to be recorded in the recording medium 12.

The user ID and the data ID are added to the image data sets S and the thumbnail image data sets TS as the tag information thereof. However, how the user ID and the data ID are added is not limited to this manner, and the IDs may be stored in a file separate from the image data sets S and the thumbnail image data sets TS, as long as the IDs are related to the image data sets S and the thumbnail image data sets TS.

The controller 25 adds the apparatus type information representing the type of the digital camera 10 and medium type information representing the type of the recording medium 12 to the respective image data sets S to be stored in the storage system 23. The apparatus type information and the medium type information is added to the image data sets S as the tag information thereof, which is not limited to this manner. As long as the apparatus type information and the medium type information is related to the image data sets S, the information may be stored in a file separate from the image data sets S, or only either type of the information may be added to the image data sets S.

The user ID, the data ID, the apparatus type information, and the medium type information are added to the image data sets S as the tag information thereof, at the time the user 1 acquires the image data sets S. Therefore, processing for adding the IDs and the information is not specifically carried out. In the case where the IDs and the information are not added to the image data sets S, the IDs and the information are added to the image data sets S by inputting the IDs and the information to the controller 25.

A photographing condition, printing command information specifying the processing to be carried out at the time of printing, and information representing a color space and a compression method may have been included in the tag information of the respective image data sets S in some cases, which are also added to the image data sets S to be stored in the storage system 23.

The digital camera 10 may have a function of inputting a comment or a sound in some cases. In this case, data representing the comment or the sound is stored in the recording medium 12 while being related to the image data sets S. Therefore, the data may also be read from the recording medium 12 and stored in the storage system 23 while being related to the image data sets S.

Meanwhile, the fact that the image data sets S having the same file names or the same data IDs have been stored under a directory corresponding to the user ID may be found in some cases when the image data sets S are to be stored. Therefore, whether or not the image data sets S having the same file names or the same data IDs are stored under the directory for the user in the storage system 23 is judged. If a result of this judgment is affirmative, the image data sets S are not stored in the directory, since the thumbnail image data sets TS are highly likely to have been generated and stored in the recording medium 12.

In the case where the thumbnail image data sets TS have already been stored in the recording medium 12, the controller 25 adds newly generated thumbnail image data sets TS in the recording medium 12, without writing the new thumbnail image data sets TS over the existing thumbnail image data sets TS.

The free space of the recording medium 12 becomes smaller if generation of the thumbnail image data sets TS and recording in the recording medium 12 are repeated. For this reason, in the case where the total size of the thumbnail image data sets TS exceeds a predetermined proportion (such as 50%) of the capacity of the recording medium 12, reduced thumbnail image data sets representing reduced thumbnail images of the existing thumbnail image data sets TS and the new thumbnail image data sets TS are generated and output to the card slot 21. The reduced thumbnail image data sets are recorded in the recording medium 12, instead of the existing thumbnail image data sets TS. In this case, the existing thumbnail image data sets TS are deleted from the recording medium 12. The quality of the reduced thumbnail images represented by the reduced thumbnail image data sets is preferably sufficient for image confirmation, although the quality is lower than the quality of the thumbnail image data sets TS.

By recording the reduced thumbnail image data sets instead of the thumbnail image data sets TS, the free space of the recording medium 12 can be saved while the image data sets S stored in the storage system 23 are still managed.

Figure 2:
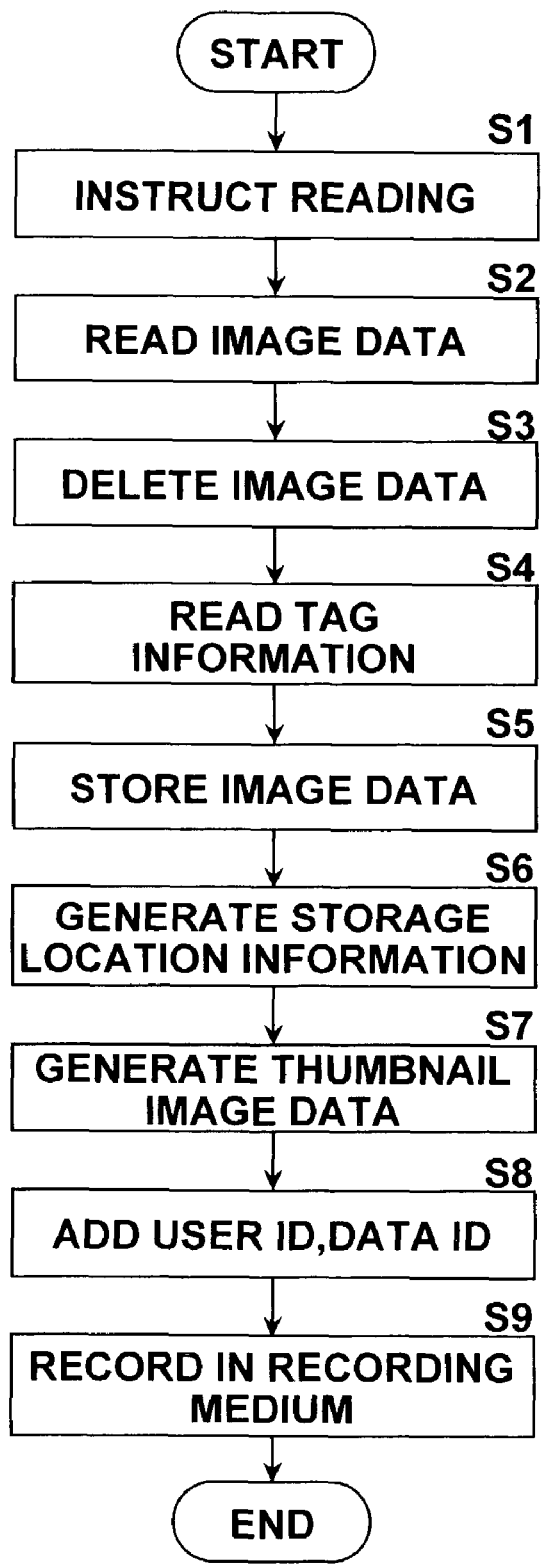
FIG. 2 is a flow chart showing an image data storing operation.

The operation of the first embodiment will be explained next. FIG. 2 is a flow chart showing an image data storing operation in this embodiment. The user 1 has obtained the image data sets S by photography with the imaging means 11 of the digital camera 10, and has recorded the image data sets S in the recording medium 12. The user 1 brings the recording medium 12 to the DPE store 2 for storage of the image data sets S. The user ID, the data ID, the apparatus type information, and the medium type information have been added to each of the image data sets S, as the tag information thereof.

The recording medium 12 is set in the card slot 21, and reading of the image data sets S is instructed (Step S1). The controller 25 controls the card slot 21 and reads the image data sets S from the recording medium 12 (Step S2), and deletes the image data sets S from the recording medium 12 (Step S3). Each of the image data sets S has been added with the tag information including the user ID, the data ID, the apparatus type information and the medium type information, and the tag information is also read (Step S4). The image data sets S are output to the storage system 23 and stored therein (Step S5). At this time, the storage location information SI is generated (Step S6). The storage system 23 has the directory dedicated to the user 1, and the image data sets S of the user 1 are stored under the directory therefor.

The thumbnail image data sets TS representing the thumbnail images of images represented by the image data sets S are generated, based on the image data sets S (Step S7). The user ID and the data ID are added to each of the thumbnail image data sets TS as the tag information thereof (Step S8), and output to the card slot 21 to be recorded in the recording medium 12 (Step S8) together with the storage location information SI, the processing information PI, and access information for accessing the communication IF 24 of the DPE store 2 (such as the URL or IP address of the communication IF 24). After the operation ends in this manner, the recording medium 12 having the thumbnail image data sets TS recorded therein is provided to the user 1.

Since the image data sets S have been deleted from the recording medium 12, the free space of the recording medium 12 becomes larger than in the case of the image data sets S still stored therein. As a result, the user 1 can further carry out photography with the recording medium 12. When the free space in the recording medium 12 becomes small, the user 1 requests storage of the image data sets S from the DPE store 2. The thumbnail image data sets TS are again generated from the image data sets S and the newly generated thumbnail image data sets TS are further recorded in the recording medium 12.

As has been described above, in the first embodiment, the image data sets S read from the recording medium 12 are stored in the storage system 23 while the thumbnail image data sets TS generated from the image data sets S are stored in the recording medium 12 together with the storage location information SI for identifying the storage location of the image data sets S. Since the image data sets S are stored in the storage system 23, the image data sets S do not need to be stored in the recording medium 12. Consequently, by deleting the image data sets S from the recording medium 12, the free space in the recording medium 12 can be saved for further photography with the recording medium 12.

By referring to the thumbnail image data sets TS stored in the recording medium 12, the image data sets S stored in the storage system 23 in the DPE store 2 can be easily confirmed. Furthermore, since the storage location information SI is also recorded in the recording medium 12, the image data sets S can be easily accessed with reference to the storage location information SI. Since the thumbnail image data sets TS have a smaller data size than the image data sets S, the thumbnail image data sets TS for more of the image data sets S can be recorded in the recording medium 12. Consequently, a large amount of the image data sets S can be managed easily by using the recording medium 12 alone. Moreover, since the recording medium 12 is portable, the image data sets S can be managed easily by a digital camera 10 without involving a personal computer, which benefits the user 1 regardless of whether the user 1 has a personal computer or not.

The user ID and the data ID are added to each of the image data sets S and stored in the storage system 23 while the user ID and the data ID are also added to each of the thumbnail image data sets TS and recorded in the recording medium 12. In this manner, the image data sets S can be easily related to the thumbnail image data sets TS. If processing needs to be carried out on the image data sets S, the image data sets S can be easily searched for and processed by simply referring to the user ID and the data ID added to each of the thumbnail image data sets TS.

In this case, by referring to the user ID and the data ID, the user 1 can display the thumbnail image data sets TS on the monitor 15 of the digital camera 10 as desired, and can request transfer of the image data sets S corresponding to the thumbnail image data sets TS displayed on the monitor 15 from the communication IF 24 of the DPE store 2, in order to download the image data sets S to the digital camera 10. By downloading the image data sets S to the digital camera 10 in this manner, the image data sets S of higher quality can be displayed on the monitor 15. Furthermore, by downloading the image data sets S to a high definition display apparatus such as a digital TV set, the images can be displayed in high definition.

The format of the image data sets S varies, depending on the type of the digital camera 10 that generated the image data sets S and the recording medium 12 that stores the image data sets S. Therefore, the processing carried out on the image data sets S also becomes different in accordance with the format. Consequently, by adding the apparatus type information and the medium type information to the image data sets S and stores the information in the storage system 23, the image processing in accordance with the format of the image data sets S can be carried out easily on the image data sets S, by referring to the apparatus type information and the medium type information.

In the case where the user 1 requests from the DPE store 2 storage of the image data sets S that have been acquired by using an apparatus of a type different from the digital camera 10 and recorded in a recording medium of a type different from the recording medium 12, the thumbnail image data sets TS need to be generated from the image data sets S existing in the storage system 23, in order to be recorded in the recording medium of the different type. In this case, the format needs to be changed, in accordance with the type of the apparatus and the type of the recording medium. Therefore, whether or not the format of the existing image data sets S stored in the storage system 23 agrees with the format of the image data sets S whose storage is newly requested can be easily judged by referring to the apparatus type information and the medium type information added to each of the existing image data sets. If a result of the judgment is negative, the thumbnail image data sets TS that are appropriate for the apparatus and the recording medium are generated from the existing image data sets S in the storage system 23, in order to be recorded in the recording medium of the different type together with the thumbnail image data sets TS newly generated from the image data sets S that are stored newly in the storage system 23.

A result of an experiment carried out by the inventor will be explained next. The experiment is regarding the free space of the recording medium 12 after deletion of the image data sets S from the recording medium 12 and recording the thumbnail image data sets TS in the recording medium 12. The image data sets S having 1920×1440 pixels each are obtained by the digital camera 10 and subjected to JPEG compression at a compression rate of 1/10. The size of each of the image data sets S is approximately 800 KB. The recording medium 12 has the capacity of 32 MB. In this case, the recording medium 12 can store the image data sets S for up to 40 frames.

When the thumbnail image data sets TS are generated from the image data sets S, the number of pixels is reduced to 640×480 pixels corresponding to VGA size, and JPEG compression at the compression rate of 1/12 is carried out. In this manner, the size of the thumbnail image data sets TS for the 40 frames becomes approximately 3.2 MB.

Therefore, when the thumbnail image data sets TS for the 40 frames are recorded in the recording medium 12 after deletion of all the image data sets S of the 40 frames, the free space of the recording medium 12 becomes approximately 28.8 MB. Since the monitor 15 of the digital camera 10 has 320×340 pixels, the thumbnail image data sets TS of VGA size are sufficient for reproduction on the monitor 15.

Since the recording medium 12 still has the free space of 28.8 MB, the user 1 can further record the image data sets S of 36 new frames in the recording medium 12. In this state, the recording medium 12 has the data sets of 76 frames. When the user 1 again requests storage of the image data sets S from the DPE store 2, the thumbnail image data sets TS are generated from the image data sets S for the 36 frames to occupy approximately 2.88 MB. Therefore, when the newly generated thumbnail image data sets TS are added in the recording medium 12, the size of the thumbnail image data sets TS in the recording medium 12 becomes approximately 6.08 MB.

By repeating storage of the image data sets S in the storage system 23 and recording of the thumbnail image data sets TS in the recording medium 12, the user 1 can add to the recording medium 12 the thumbnail image data sets TS enabling reproduction on the monitor 15 in sufficient quality.

When the user 1 requests storage of the image data sets S for the fifth time, the recording medium 12 theoretically has approximately 18.9 MB of free space. In this case, the recording medium 12 can further store the image data sets S for up to 23 frames, and the number of the data sets in the recording medium 12 becomes 187 after recording the 23 frames therein. However, since the number of the image data sets S that can be stored at once in the recording medium 12 decreases gradually, the user 1 requests from the DPE store 2 recording of the reduced thumbnail image data sets instead of the thumbnail image data sets TS in the recording medium 12 when the user 1 requests storage of the image data sets S next time.

More specifically, the existing image data sets S stored in the storage system 23 and the image data sets S that were recorded in the recording medium 12 this time are resized to have 320×240 pixels each, and the compression rate therefor is changed to 1/28 for generation of the reduced thumbnail image data sets. The user 1 requests from the DPE store 2 recording of the reduced thumbnail image data sets in the recording medium 12, instead of the thumbnail image data sets TS.

The reduced thumbnail image data sets have sufficient quality for reproduction on the monitor 15 of the digital camera 10, although the quality thereof is low when reproduced by a display medium having a large number of pixels, such as a digital TV set. The reduced thumbnail image data sets have the data size of approximately 1 MB for the 187 frames. Therefore, by recording the reduced thumbnail image data sets in the recording medium 12, the free space of the recording medium 12 becomes approximately 31 MB, which enables recording of the image data sets S for 38 new frames.

As has been described above, by repeating storage of the image data sets S in the storage system 23 and recording of the thumbnail image data sets TS or the reduced thumbnail image data sets in the recording medium 12, the recording medium 12 still theoretically has the free space of 19.3 MB at the time the user 1 requests storage of the image data sets S for the $50^{th}$ time. At the same time, the reduced thumbnail image data sets having sufficient quality for reproduction on the monitor 15 can be stored in the recording medium 12 for 1600 frames.

Figure 3:
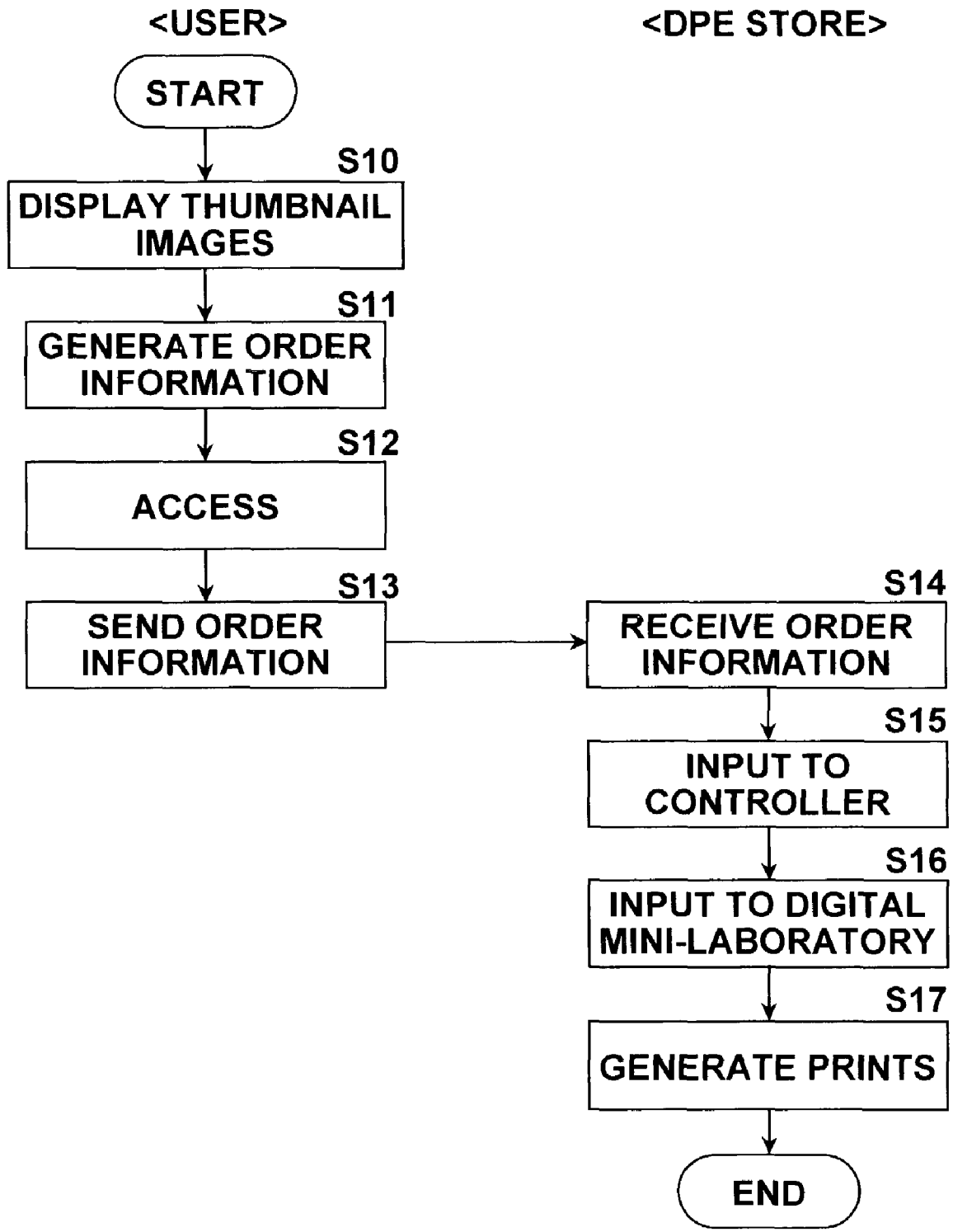
FIG. 3 is a flow chart showing a print order operation and a print order processing operation.

The operation of placing the print order by using the digital camera 10 and processing thereof will be explained next. FIG. 3 is a flow chart showing the operation. The controller 16 of the digital camera 10 places the print order by using the input means 17 and the software installed in the memory 14 of the digital camera 10. The thumbnail image data sets TS are displayed on the monitor 15 according to an instruction for order information generation (Step S10). The user 1 selects one or more of the thumbnail image data sets TS to place the print order therefor, and inputs a print size, a print quantity, and the like. Based on the input, the order information C is generated (Step S11). The order information C includes the user ID and the data ID added to each of the thumbnail image data sets TS, the quantity, information representing processing, and the name, the address, and the phone number of the user 1. Since the user 1 can confirm the print processing available at the DPE store 2 by referring to the processing information PI recorded in the recording medium 12, the order information C can be generated in accordance with the print processing carried out at the DPE store 2.

Whether or not transfer of the order information C has been instructed is then judged. If a result is affirmative, the communication terminal 13 accesses the communication IF 24 of the DPE store 2, based on the access information recorded in the recording medium 12 (Step S12). The order information C is then sent thereto (Step S13).

The communication IF 24 receives the order information C (Step S14), and inputs the order information C to the controller 25 (Step S15). The controller 25 reads the image data sets S to be printed from the storage system 23, based on the user ID and the data ID included in the order information C, and inputs the image data sets S to the digital mini-laboratory 22 (Step S16). In the digital mini-laboratory 22, the image processing apparatus 22B carries out image processing on the image data sets S, and the printer 22A of the digital mini-laboratory 22 prints the image data sets S, based on the order information C. In this manner, the prints P are generated (Step S17), and the operation ends.

The user 1 has been notified of the time of delivery of the prints P. The user 1 visits the DPE store thereafter and receives the prints P after paying a charge therefor. The prints P may be delivered or mailed to the user 1.

Figure 4:
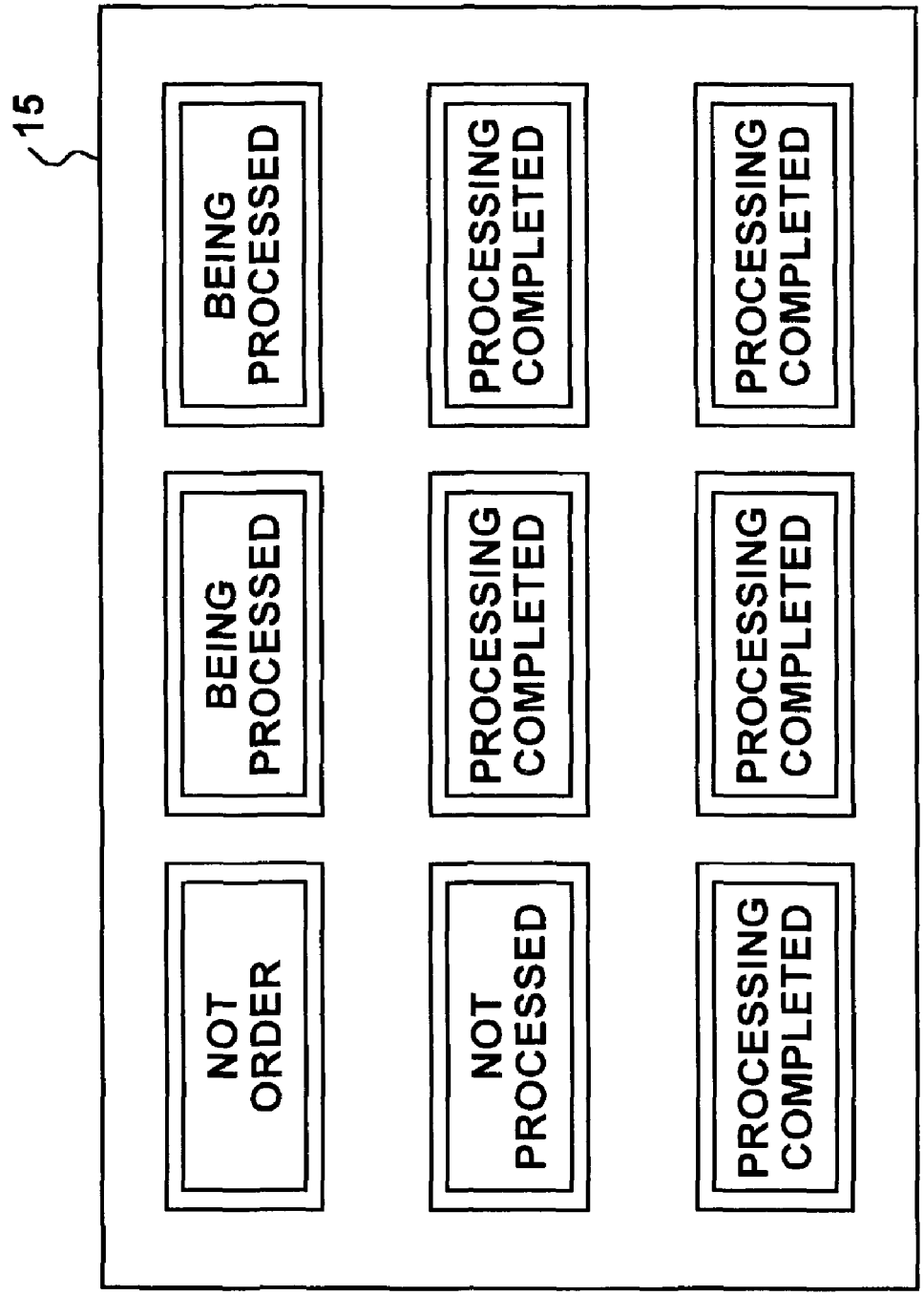
FIG. 4 shows how status information is displayed on a monitor.
Figure 5:
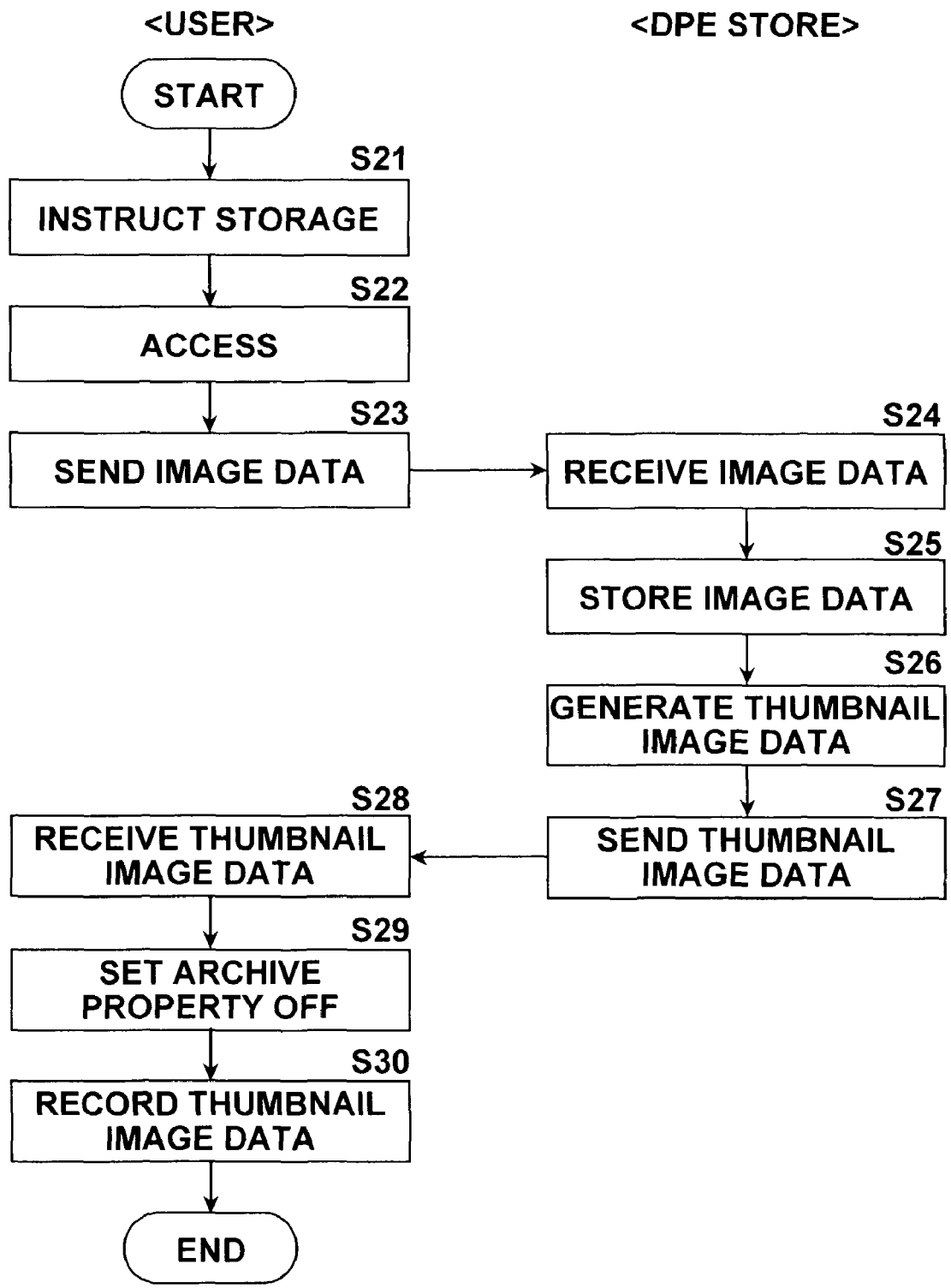
FIG. 5 is a flow chart showing an image data storing operation in a second embodiment of the present invention.

The controller 25 may generate status information representing a state of printing processing regarding the image data sets S, such as "not processed", "being processed", and "processing completed". In this manner, the user 1 can inquire the processing state by accessing the communication IF 24 by using the communication terminal 13 of the digital camera 10. In the case where the user 1 has inquired the processing state, the controller 25 sends the status information to the digital camera 10 via the communication IF 24, and displays the status information on the monitor 15 of the digital camera 10. FIG. 4 shows how the status information is displayed on the monitor 15. As shown in FIG. 4, the status information is shown by characters such as "not processed", "being processed", and "processing completed". For the images not to be printed, characters "not ordered" may be displayed. The user 1 receives the prints P after "processing completed" is displayed for all the image data sets S to be printed.

Meanwhile, when the user 1 requests storage regarding the image data sets S in the recording medium 12, information on time necessary for processing a print order may be recorded in the recording medium 12 so that the controller 16 of the digital camera 10 can judge and generate the status information based on the information regarding the processing time. The status information is displayed on the monitor 15. In other words, the time elapsed since transfer of the order information C is measured by a timer (not shown) installed in the controller 16 and compared with the processing time. In the case where the processing time has elapsed, "processing completed" is displayed. Otherwise, "being processed" is displayed. In this case, "not processed" has the same meaning as "not ordered". Therefore, only "not ordered" is displayed for the images not to be printed.

In the above embodiment, the thumbnail image data sets TS are stored in the recording medium 12 that stores the image data sets S to be stored in the storage system 23. However, the DPE store 2 may receive the recording medium 12 and provide another recording medium of the same type to the user 1. In this case, the DPE store 2 carries out reading of the image data sets S from the recording medium 12, deletion of the image data sets S from the recording medium 12, storage of the image data sets S in the storage system 23, generation of the thumbnail image data sets TS, and recording of the thumbnail image data sets TS in the recording medium 12 before the user 1 visits the DPE store 2 again. During this time, the user 1 does not need to wait at the DPE store 2 for the processing described above. The recording medium 12 and another empty recording medium may also be provided to the user 1 after the image data sets S are read from the recording medium 12.

In the case where the thumbnail image data sets TS are recorded in the recording medium 12 that stores the image data sets S, the space of the recording medium 12 may be divided by directories into an area for recording the thumbnail image data sets TS and an area for recording the image data sets S. In this manner, the user 1 can easily manage the image data sets S and the thumbnail image data sets TS in the same recording medium 12.

In the above embodiment, the user 1 requests storage of the image data sets S by bringing the recording medium 12 to the DPE store 2. However, the image data sets S may be sent to the DPE store 2 from the communication terminal 13 of the digital camera 10. Hereinafter, this manner will be explained as a second embodiment of the present invention. FIG. 2 is a flow chart showing an image data set storage operation in the second embodiment. In this embodiment, the user 1 has already obtained the access information for accessing the communication IF 24 of the DPE store 2 and stored the access information in the memory 14 of the digital camera 10.

When an instruction for storing the image data sets S is input from the input means 17 (Step S21), the communication terminal 13 accesses the communication IF 24 of the DPE store 2, based on the access information stored in the memory 14 (Step S22). After the access, the image data sets S are transferred from the communication terminal 13 to the communication IF 24 (Step S23), and the communication IF 24 receives the image data sets S (Step S24).

The image data sets S are stored in the storage system 23 (Step S25), and the thumbnail image data sets TS are generated from the image data sets S (Step S26). The thumbnail image data sets TS are sent from the communication IF 24 to the communication terminal 13 of the digital camera 10 (Step S27). At this time, as in the first embodiment, the user ID, the data ID, the storage location information SI, and the processing information PI are added to each of the thumbnail image data sets TS and sent. The communication terminal 13 receives the thumbnail image data sets TS (Step S28), and sets the Archive property of each of the image data sets S in the recording medium 12 OFF (Step S29). The thumbnail image data sets TS are then recorded in the recording medium 12 (Step S30), and the operation ends. In the case where the recording medium 12 does not have enough free space, the user 1 deletes the image data sets S whose Archive property is off, in order to increase the size of free space in the recording medium 12.

Figure 6:
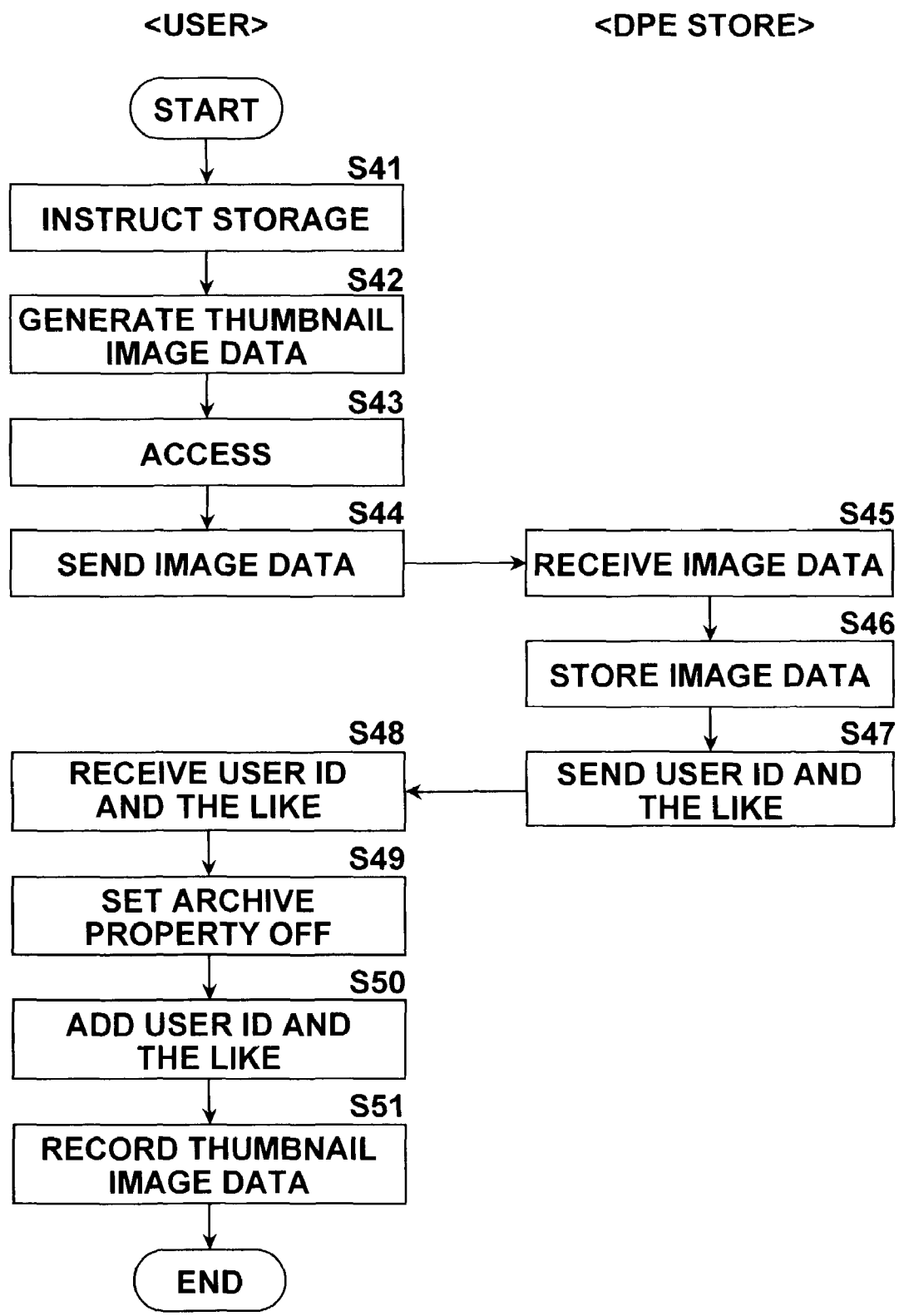
FIG. 6 is a flow chart showing an image data storing operation in a third embodiment of the present invention.

In the above embodiment, the thumbnail image data sets TS are generated by the DPE store 2. However, the thumbnail image data sets TS may be generated by the digital camera 10. Hereinafter, this manner will be explained as a third embodiment of the present invention. FIG. 6 is a flow chart showing an image data storage operation in the third embodiment. In this embodiment, the user 1 has already obtained the access information for accessing the communication IF 24 of the DPE store 2 and stored the access information in the memory 14 of the digital camera 10.

When an instruction for storing the image data sets S is input from the input means 17 of the digital camera 10 (Step S41), the controller 16 generates the thumbnail image data sets TS from the image data sets S (Step S42). The communication terminal 13 accesses the communication IF 24 of the DPE store 2, based on the access information stored in the memory 14 (Step S43). After the access, the image data sets S are sent to the communication IF 24 (Step S44), and the communication IF 24 receives the image data sets S (Step S45).

The image data sets S are stored in the storage system 23 (Step S46). The user ID, the data ID, the storage location information SI, and the processing information PI (hereinafter referred to as the user ID and the like) are sent from the communication IF 24 to the communication terminal 13 of the digital camera 10 (Step S47). The communication terminal 13 receives the user ID and the like, (Step S48), and sets the Archive property of each of the image data sets S in the recording medium 12 OFF (Step S49). The user ID and the like are added to each of the thumbnail image data sets TS (Step S50), and the thumbnail image data sets TS added with the user ID and the like are recorded in the recording medium 12 (Step S51) to end the operation. In the case where the recording medium 12 does not have enough free space, the user 1 deletes the image data sets S whose Archive property is off, in order to increase the size of free space in the recording medium 12.

In the second and the third embodiments, the Archive property of the image data sets S is set OFF after storage thereof. However, any method for indicating that the image data sets S cab be deleted may be adopted. For example, information indicating the deletion may be added to the file name of each of the image data sets S.

In the third embodiment, the controller 16 of the digital camera 10 may have a function for carrying out image processing on the thumbnail image data sets TS. In this case, a parameter for the image processing may be calculated by the controller 16, based on the image data sets S or the thumbnail image data sets TS. However, the parameter may be calculated by the controller 25 of the DPE store 2 at the time the user 1 requests storage of the image data sets S so that the parameter can be sent to the digital camera 10. In this manner, the digital camera 10 does not need to have the function for calculating the parameter, which leads to prevention of upsizing of the digital camera 10 and an increase in the cost.

In the above embodiments, storage of the image data sets S obtained by the digital camera 10 is requested from the DPE store 2. However, the present invention can be applied to the case where audio data recorded by the user 1 with an MP player or the like or downloaded from a Web site are stored in an audio server installed in a CD shop or the like. In this case, the audio data are brought to the CD store by being recorded in a memory card or the like, and the CD shop stores the audio data in the audio server. At the same time, the CD shop generates index data of the audio data and records the index data in the memory card to be returned to the user 1. As the index data, short clip data such as an introduction or highlight, or a title of the music can be used, for example.

The present invention is also applicable to the case where moving image data recorded by the user 1 with a digital camcorder or downloaded from a Web site are stored in a moving image server installed in a DPE store or the like. In this case, the moving image data are brought to the DPE store by being recorded in a memory card or the like, and the DPE store stores the moving image data in the moving image server. At the same time, the DPE store generates index data of the moving image data, and records the index data in the memory card to be returned to the user 1. As the index data, short-clip data such as introduction or highlight, or still image data representing a representative scene, or thumbnail image data thereof may be used, for example.

A skilled artisan would know that computer readable media are not limited to any specific type of storage device and includes any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. An appreciation data storing method comprising the steps of:
   sending, via a communication line, appreciation data that have been read from a first recording medium mounted in a terminal having a communication function, to data storage means to store the appreciation data in the data storage means;
   adding to index data generated from the appreciation data, a data ID for identifying the appreciation data and storage location information for identifying a location of the appreciation data in the data storage means which is accessible via the communication line and a storage location of the appreciation data on the data storage means; and
   sending to the terminal the index data to which the data ID and the storage location information have been added,
   wherein the index data represent the content of the appreciation data and have a smaller data size than the appreciation data, and
   wherein deletion information indicating whether data are deletable is given to the appreciation data recorded in the first recording medium.

2. An appreciation data storing method as defined in claim 1, further comprising the step of deleting the appreciation data from the first recording medium in the case where the first recording medium and the second recording medium are one and the same.

3. An appreciation data storing method as defined in claim 1, wherein the appreciation data are output to the data storage means in a state where a user ID for identifying a user who requested storage of the appreciation data and a data ID for identifying the appreciation data are added thereto; and
   the index data are output to the recording means in a state where the user ID and the data ID are added thereto.

4. An appreciation data storing method as defined in claim 1, wherein the index data are generated in a format appropriate for an apparatus that reproduces the index data.

5. An appreciation data storing method as defined in claim 1, further comprising the step of outputting processing information for processing the appreciation data stored in the data storage means to the recording means.

6. An appreciation data storing method as defined in claim 1, wherein, in the case where the index data exist in the first recording medium, the step of outputting the index data is the step of outputting to the recording means small-size index data that are generated to have a data size smaller than a data size of the index data but to include the content of the index data, instead of the index data.

7. A non-transitory computer readable medium having stored therein a program for causing a computer to execute an order information generation method, the program including computer executable instructions for performing procedures comprising:
   generating order information representing the content of processing to be carried out on the appreciation data, based on the index data output to the recording means and recorded in the second recording medium according to the appreciation data storing method defined in any one of claims 1 to 6.

8. An order information generation method for generating order information representing the content of processing to be carried out on the appreciation data, based on the index data output to the recording means and recorded in the second recording medium according to the appreciation data storing method defined in any one of claims 1 to 6.

9. An appreciation data processing method comprising the steps of:
  obtaining the appreciation data from the data storage means, based on the order information generated according to the order information generation method defined in claim 8; and
  generating processed appreciation data by carrying out the processing on the appreciation data, based on the order information.

10. An appreciation data processing method as defined in claim 9, wherein the appreciation data are image data and the processing that is carried out based on the order information is printing processing on the image data.

11. An appreciation data processing method as defined in claim 10, further comprising the steps of generating status information representing a state of the printing processing and outputting the status information.

12. A non-transitory computer readable medium having stored therein a program for causing a computer to execute an appreciation data processing method, the including computer executable instructions for performing procedures comprising:
  obtaining the appreciation data from the data storage means, based on the order information generated according to the order information generation method defined in claim 8; and
  generating processed appreciation data by carrying out the processing on the appreciation data, based on the order information.

13. The non-transitory computer readable medium having stored therein a program as defined in claim 12, further comprising carrying out printing processing on the image data based on the order information in the case where the appreciation data are image data.

14. The non-transitory computer readable medium having stored therein a program as defined in claim 13, the program further comprising the procedures of generating status information representing a state of the printing processing and outputting the status information.

15. An appreciation data storing method as defined in claim 1, wherein the index data generated from the appreciation data has a higher compression rate than the appreciation data.

16. The appreciation data storing method according to claim 1, further comprising enabling access to the data storage means for storing the appreciation data by using the storage location information from a device which reads out the storage location information from the second recording medium.

17. An appreciation data storing apparatus comprising control means for sending, via a communication line, appreciation data that have been read from a first recording medium mounted in a terminal having a communication function, to data storage means to store the appreciation data in the data storage means;
  means for adding to index data generated from the appreciation data, a data ID for identifying the appreciation data and storage location information for identifying a location of the appreciation data in the data storage means which is accessible via the communication line and a storage location of the appreciation data on the data storage means; and
  means for sending to the terminal the index data to which the data ID and the storage location information have been added,
  wherein the index data represent the content of the appreciation data and have a smaller data size than the appreciation data, and
  wherein deletion information indicating whether data are deletable is given to the appreciation data recorded in the first recording medium.

18. An appreciation data storing apparatus as defined in claim 17, further comprising reading means for reading the appreciation data from the first recording medium, the data storage means, index data generation means for generating the index data, storage location information generation means for generating the storage location information and/or the recording means.

19. An appreciation data storing apparatus as defined in claim 17, wherein the control means deletes the appreciation data from the first recording medium in the case where the first recording medium and the second recording medium are one and the same.

20. An appreciation data storing apparatus as defined in claim 17, wherein the control means outputs a user ID for identifying a user who requested storage of the appreciation data and a data ID for identifying the appreciation data to the data storage means by adding the user ID and the data ID to the appreciation data, and outputs the user ID and the data ID to the recording means by adding the user ID and the data ID to the index data.

21. An appreciation data storing apparatus as defined in claim 17, wherein the index data are generated in a format appropriate for an apparatus that reproduces the index data.

22. An appreciation data storing apparatus as defined in claim 17, wherein the control means outputs processing information for processing the appreciation data stored in the data storage means to the recording means.

23. An appreciation data storing apparatus as defined in claim 17, wherein, in the case where the index data exist in the first recording medium, the control means outputs to the recording means small-size index data that are generated to have a data size smaller than a data size of the index data but to include the content of the index data, instead of the index data.

24. An order information generation apparatus comprising generation means for generating order information representing the content of processing to be carried out on the appreciation data, based on the index data output to the recording means and recorded in the second recording medium by the appreciation data storing apparatus defined in any one of claims 17 to 23.

25. An appreciation data processing apparatus comprising:
  acquisition means for obtaining the appreciation data from the data storage means, based on the order information generated by the order information generation apparatus defined in claim 24; and
  processing means for generating processed appreciation data by carrying out the processing on the appreciation data, based on the order information.

26. An appreciation data processing apparatus as defined in claim 25, wherein the appreciation data are image data and the processing that is carried out according to the order information is printing processing on the image data.

27. An appreciation data processing apparatus as defined in claim 26, further comprising:
  status information generation means for generating status information representing a state of the printing processing; and
  output means for outputting the status information.

28. The appreciation data storing apparatus according to claim 17, wherein access is enabled to the data storage means for storing the appreciation data by using the storage location information from a device which reads out the storage location information from the second recording medium.

29. A non-transitory computer readable medium having stored therein a program for causing a computer to execute an appreciation data storing method, the program including computer executable instructions for performing procedures comprising:

sending, via a communication line, appreciation data that have been read from a first recording medium mounted in a terminal having a communication function, to data storage means to store the appreciation data in the data storage means;

adding to index data generated from the appreciation data, a data ID for identifying the appreciation data and storage location information for identifying a location of the appreciation data in the data storage means which is accessible via the communication line and a storage location of the appreciation data on the data storage means; and sending to the terminal the index data to which the data ID and the storage location information have been added, wherein the index data represent the content of the appreciation data and have a smaller data size than the appreciation data, and wherein deletion information indicating whether data are deletable is given to the appreciation data recorded in the first recording medium.

30. The non-transitory computer readable medium having stored therein a program as defined in claim 29, the program further comprising the procedure of deleting the appreciation data from the first recording medium, in the case where the first recording medium and the second recording medium are one and the same.

31. The non-transitory computer readable medium having stored therein a program as defined in claim 29, wherein the procedure of outputting the appreciation data further comprises outputting the appreciation data to the data storage means in a state where a user ID for identifying a user who requested storage of the appreciation data and a data ID for identifying the appreciation data are added thereto; and the procedure of outputting the index data further comprises outputting the index data to the recording means in a state where the user ID and the data ID are added thereto.

32. The non-transitory computer readable medium having stored therein a program as defined in claim 29, further comprising generating the index data in a format appropriate for an apparatus that reproduces the index data.

33. The non-transitory computer readable medium having stored therein a program as defined in claim 29, the program further comprising the procedure of outputting processing information for processing the appreciation data stored in the data storage means to the recording means.

34. The non-transitory computer readable medium having stored therein a program as defined in claim 29, the procedure of outputting the index data further comprises outputting to the recording means small-size index data that are generated to have a data size smaller than a data size of the index data which include the content of the index data, in the case where the index data exist in the first recording medium.

35. The non-transitory computer readable medium having stored therein a program as defined in claim 29, the program further comprising the procedure of enabling access to the data storage means for storing the appreciation data by using the storage location information from a device which reads out the storage location information from the second recording medium.

36. A non-transitory computer-readable recording medium having stored therein a program that causes a computer to execute an appreciation data storing method, the program including computer executable instructions for performing the procedures comprising:

sending, via a communication line, appreciation data that have been read from a first recording medium mounted in a terminal having a communication function, to data storage means to store the appreciation data in the data storage means;

adding to index data generated from the appreciation data, a data ID for identifying the appreciation data and storage location information for identifying a location of the appreciation data in the data storage means which is accessible via the communication line and a storage location of the appreciation data on the data storage means; and sending to the terminal the index data to which the data ID and the storage location information have been added, wherein the index data represent the content of the appreciation data and have a smaller data size than the appreciation data, and wherein deletion information indicating whether data are deletable is given to the appreciation data recorded in the first recording medium.

37. The non-transitory computer-readable recording medium having stored therein a program as defined in claim 36, the program further comprising the procedure of deleting the appreciation data from the first recording medium, in the case where the first recording medium and the second recording medium are one and the same.

38. The non-transitory computer-readable recording medium having stored therein a program as defined in claim 36, wherein the procedure of outputting the appreciation data the procedure of outputting the appreciation data to the data storage means in a state where a user ID for identifying a user who requested storage of the appreciation data and a data ID for identifying the appreciation data are added thereto; and the procedure of outputting the index data the procedure of outputting the index data to the recording means in a state where the user ID and the data ID are added thereto.

39. The non-transitory computer-readable recording medium having stored therein a program as defined in claim 36, further comprising generating the index data in a format appropriate for an apparatus that reproduces the index data.

40. The non-transitory computer-readable recording medium having stored therein a program as defined in claim 36, the program further comprising the procedure of outputting processing information for processing the appreciation data stored in the data storage means to the recording means.

41. The non-transitory computer-readable recording medium having stored therein a program as defined in claim 36, the procedure of outputting the index data further comprises outputting to the recording means small-size index data that are generated to have a data size smaller than a data size of the index data which include the content of the index data, in the case where the index data exist in the first recording medium.

42. An appreciation data storing method comprising:

sending, via a communication line, appreciation data that have been read from a first recording medium mounted in a terminal having a communication function, to data storage means to store the appreciation data in the data storage means;

adding to index data generated from the appreciation data, a data ID for identifying the appreciation data and storage location information for identifying a location of the appreciation data in the data storage means which is accessible via the communication line and a storage location of the appreciation data on the data storage means; and sending to the terminal the index data to which the data ID and the storage location information have been added; and outputting processing information for processing the appreciation data stored in the data storage means to the recording means, wherein the index data represent the content of the appreciation data and have a smaller data size than the appreciation data, and wherein deletion information indicating whether data are deletable is given to the appreciation data recorded in the first recording medium.

43. The appreciation data storing method according to one of claims 1 and 42, wherein the appreciation data comprises at least one of still image data, moving image data and audio, and the index data comprises at least one of reduced still image data, a specified portion of moving image data, and a specified portion of audio data.

44. The appreciation data storing method according to one of claims 1 and 42, wherein the index data for still image data comprises image data having a higher compression rate than the appreciation data.

45. The appreciation data storing method according to one of claims 1 and 42, wherein the index data for moving image data comprises reduced image data representing a frame representative of the appreciation data.

46. An appreciation data storing apparatus comprising control means for sending, via a communication line, appreciation data that have been read from a first recording medium mounted in a terminal having a communication function, to data storage means to store the appreciation data in the data storage means;

means for adding to index data generated from the appreciation data, a data ID for identifying the appreciation data and storage location information for identifying a location of the appreciation data in the data storage means which is accessible via the communication line and a storage location of the appreciation data on the data storage means; and means for sending to the terminal the index data to which the data ID and the storage location information have been added, and for outputting processing information for processing the appreciation data stored in the data storage means to the recording means, wherein the index data represent the content of the appreciation data and have a smaller data size than the appreciation data, and wherein deletion information indicating whether data are deletable is given to the appreciation data recorded in the first recording medium.

47. The appreciation data storing apparatus according to one of claims 17 and 46, wherein the appreciation data comprises at least one of still image data, moving image data and audio, and the index data comprises at least one of reduced still image data, a specified portion of moving image data, and a specified portion of audio data.

48. The appreciation data storing apparatus according to one of claims 17 and 46, wherein the index data for still image data comprises image data having a higher compression rate than the appreciation data.

49. The appreciation data storing apparatus according to one of claims 17 and 46, wherein the index data for moving image data comprises reduced image data representing a frame representative of the appreciation data.

50. A non-transitory computer readable medium having stored therein a program for causing a computer to execute an appreciation data storing method, the program including computer executable instructions for performing procedures comprising:

sending, via a communication line, appreciation data that have been read from a first recording medium mounted in a terminal having a communication function, to data storage means to store the appreciation data in the data storage means;

adding to index data generated from the appreciation data, a data ID for identifying the appreciation data and storage location information for identifying a location of the appreciation data in the data storage means which is accessible via the communication line and a storage location of the appreciation data on the data storage means; and sending to the terminal the index data to which the data ID and the storage location information have been added; and outputting processing information for processing the appreciation data stored in the data storage means to the recording means, wherein the index data represent the content of the appreciation data and have a smaller data size than the appreciation data, and wherein deletion information indicating whether data are deletable is given to the appreciation data recorded in the first recording medium.

51. A non-transitory computer-readable recording medium having stored therein a program that causes a computer to execute an appreciation data storing method, the program including computer executable instructions for performing the procedures comprising:

sending, via a communication line, appreciation data that have been read from a first recording medium mounted in a terminal having a communication function, to data storage means to store the appreciation data in the data storage means;

adding to index data generated from the appreciation data, a data ID for identifying the appreciation data and storage location information for identifying a location of the appreciation data in the data storage means which is accessible via the communication line and a storage location of the appreciation data on the data storage means; and sending to the terminal the index data to which the data ID and the storage location information have been added; and outputting processing information for processing the appreciation data stored in the data storage means to the recording means, wherein the index data represent the content of the appreciation data and have a smaller data size than the appreciation data, and wherein deletion information indicating whether data are deletable is given to the appreciation data recorded in the first recording medium.

52. The non-transitory computer readable medium having stored therein a program as defined in one of claims 29, 36, 50 and 51, wherein the appreciation data comprises at least one of still image data, moving image data and audio, and the index data comprises at least one of reduced still image data, a specified portion of moving image data, and a specified portion of audio data.

53. The non-transitory computer readable medium having stored therein a program as defined in one of claims 29, 36, 50 and 51, the program further comprising wherein the index data for still image data comprises image data having a higher compression rate than the appreciation data.

54. The non-transitory computer readable medium having stored therein a program as defined in one of claims 29, 36, 50 and 51, wherein the index data for moving image data comprises reduced image data representing a frame representative of the appreciation data.

* * * * *